United States Patent

Preisler et al.

[11] Patent Number: 6,053,526
[45] Date of Patent: Apr. 25, 2000

[54] AIR BAG COVER ASSEMBLY HAVING A MEMBRANE SWITCH AND AN ORNAMENTAL PAD PERMANENTLY FASTENED THERETO AND METHOD OF MAKING SAME

[75] Inventors: Darius J. Preisler, Macomb; Jason T. Murar, Clinton Township, both of Mich.

[73] Assignee: Larry J. Winget, Leonard, Mich.

[21] Appl. No.: 09/226,497

[22] Filed: Jan. 7, 1999

Related U.S. Application Data

[63] Continuation-in-part of application No. 09/055,848, Apr. 6, 1998.

[51] Int. Cl.$^7$ .................................................. B60R 21/16
[52] U.S. Cl. ........................................ 280/728.2; 280/731
[58] Field of Search .............................. 280/728.2, 728.3, 280/731

[56] References Cited

U.S. PATENT DOCUMENTS

| | | |
|---|---|---|
| 4,139,664 | 2/1979 | Wenrick . |
| 4,934,735 | 6/1990 | Embach . |
| 5,062,661 | 11/1991 | Winget . |
| 5,085,462 | 2/1992 | Gualtier . |
| 5,186,490 | 2/1993 | Adams et al. . |
| 5,198,629 | 3/1993 | Hayashi et al. . |
| 5,308,106 | 5/1994 | Heidorn . |
| 5,338,059 | 8/1994 | Inoue et al. . |
| 5,344,185 | 9/1994 | Cooke, II . |
| 5,369,232 | 11/1994 | Leonelli . |
| 5,371,333 | 12/1994 | Kanai et al. . |
| 5,463,258 | 10/1995 | Filion et al. . |
| 5,465,998 | 11/1995 | Davis . |
| 5,487,557 | 1/1996 | Eckhout . |
| 5,499,841 | 3/1996 | Trojan et al. . |
| 5,529,336 | 6/1996 | Eckhout . |
| 5,542,694 | 8/1996 | Davis ........................................ 280/731 |
| 5,569,893 | 10/1996 | Seymour . |
| 5,577,766 | 11/1996 | Niwa et al. .............................. 280/731 |
| 5,630,617 | 5/1997 | Hashiba ................................... 280/731 |
| 5,639,114 | 6/1997 | Margetak et al. . |
| 5,642,901 | 7/1997 | Bowman et al. . |
| 5,678,849 | 10/1997 | Davis ........................................ 280/731 |
| 5,678,851 | 10/1997 | Saito et al. . |
| 5,685,561 | 11/1997 | Kauer . |
| 5,725,241 | 3/1998 | Schenck . |
| 5,775,721 | 7/1998 | Grout ........................................ 280/731 |

*Primary Examiner*—Kenneth R. Rice
*Attorney, Agent, or Firm*—Brooks, Kushman P.C.

[57] ABSTRACT

An air bag cover assembly is provided including a front panel adapted to overlie an undeployed air bag, an ornamental pad permanently fastened to the front panel within an outer recessed portion, and a membrane-type switch lying behind the rear inner surface of the pad in a switch location area defined by a plastic top plate and an ornament of the ornamental pad. In a first embodiment, the ornament is a plastic ornament integrally formed with the plastic top plate. In a second embodiment, the ornament is fixedly secured as a separate part to the plastic top plate. In the second embodiment, the plastic top plate is a thermoplastic elastomeric body having a front surface and a rear surface. The body has a plurality of slots extending between the front and rear surfaces at predetermined spaced locations and wherein the ornament is a decorative badge having a plurality of tabs which extend through the corresponding slots, each of the tabs having a bent portion pressing against the rear surface of the elastomeric body so as to create a constant load on the elastomeric body, wherein the elastomeric body exerts an opposing reaction to the constant load thereby allowing the decorative badge to be fixedly secured to the elastomeric body.

12 Claims, 2 Drawing Sheets

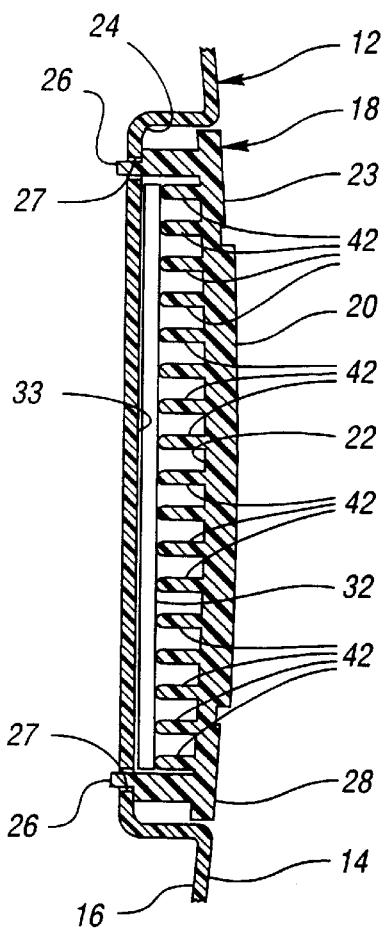
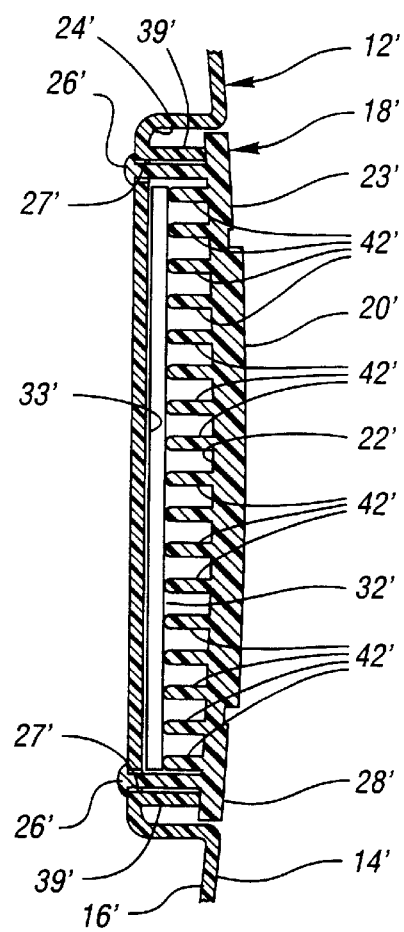
*Fig. 3*
*Fig. 4*
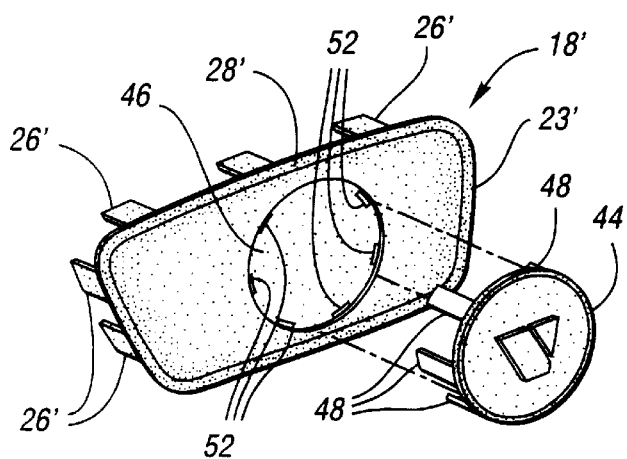
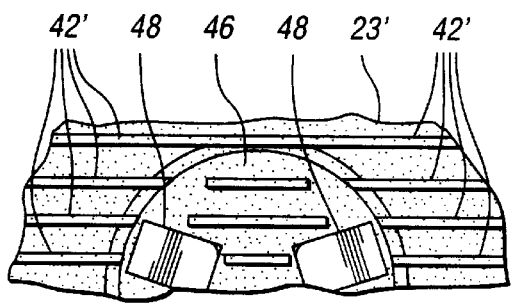
*Fig. 5*
*Fig. 6*

AIR BAG COVER ASSEMBLY HAVING A MEMBRANE SWITCH AND AN ORNAMENTAL PAD PERMANENTLY FASTENED THERETO AND METHOD OF MAKING SAME

CROSS-REFERENCE TO RELATED APPLICATIONS

This application is a continuation-in-part application of pending U.S. application Ser. No. 09/055,848, filed Apr. 6, 1998, entitled "Air Bag Cover And Method Of Making Same.

TECHNICAL FIELD

This invention relates to an air bag cover assembly having a membrane switch and an ornamental pad permanently fastened thereto and method of making same.

BACKGROUND ART

Conventional air bag covers used in conjunction with occupant restraint systems may sometimes include decorative badges or ornaments attached thereto either as a separate part of or integrally formed with the cover. Such ornaments may take the form of a logo or mark representing a vehicle name or manufacturer or the like. These decorative badges are generally aesthetically pleasing and help to enhance the overall appearance of the interior of the automotive vehicle. Since an air bag cover moves away from the steering column during automatic inflation of the air bag, the associated decorative badge must be securely attached thereto so that it does not come off during this action.

The U.S. Pat. No. 5,678,851 to Saito et al. discloses an air bag module cover which includes a cover member, an ornament on the cover member, and a rigid ornament-mounting structure including a fastener and a retainer. In one embodiment, a connecting film which fixes the ornament on the cover member has a membrane-type switch.

Problems associated with such prior art air bag covers include limited switch activation area, complexity and cost of assembly, the stacking of tolerances, and potential danger caused by small parts which form part of the cover assembly and which may fly from the assembly during air bag deployment.

U.S. Pat. Nos. 5,529,336 and 5,487,557 to Eckhout discloses air bag covers having decorative appliques fastened thereto. Each decorative applique is disposed adjacent a tear seam in a non-overlapping fashion to prevent any interference with the inflation or exit of the air bag upon operation. The decorative applique includes a thin plastic layer extruded onto a decorative applique film. The decorative applique assembly is attached to the air bag cover by inserting connecting towers extending from the rear surface of the applique through fastening apertures which extend completely through the front cover of the air bag cover. Portions of the connecting tower extend out from the fastening apertures so that they may be deformed to form a retaining member larger in diameter than the fastening aperture so as to affix the applique to the air bag cover. The preferred method of deforming the portion includes applying a stream of heated air to the portion to melt the portion and then applying a cold stake directly to the melted portion to form the retaining member.

U.S. Pat. No. 4,139,664 to Wenrick discloses an elongated extruded strip adapted to be mechanically secured to a slotted sheet-like substrate. A thermoplastic material is continuously extruded in any desired cross-sectional configuration including a rear face having at least one rearwardly projecting rail. Longitudinally spaced apart sections of this rail are removed to provide longitudinally spaced rearwardly projecting teeth which enable mechanical securement of the extrusion to a supporting substrate having slots through which the teeth are extended.

U.S. Pat. No. 5,371,333 discloses a steering wheel pad with a horn switch assembly. A plurality of ribs are integrally formed on a bottom surface of an outer member. The ribs abut with the top surface of an inner member on the top surface of a switch body of a horn switch. When the outer member is not pressed, the ribs maintain the outer member in a predetermined shape. When the outer member is pressed, the ribs transmit the pressure to the switch body.

U.S. Pat. No. 5,085,462 issued to Gaultier discloses an air bag and vehicle horn switch assembly. Gaultier also discloses a conventional two-piece cover construction.

U.S. Pat. No. 5,186,490 issued to Adams et al. discloses a cover for an inflatable restraint system for a motor vehicle which contains a slot in the upper wall thereof into which a replaceable thin or membrane-type switch assembly is inserted.

The Embach U.S. Pat. No. 4,934,735 discloses a device which has inner and outer covers or plates, each of which has split lines which separate the upper walls into upwardly and oppositely opening upper and lower pairs of flaps to permit deployment of the inflatable cushion. A switch assembly is located between either or both pair of flaps and includes one or more membrane switches located between the flaps and respective key pads projecting outwardly of the cover flap for closing respective pairs of circuits on the upper and lower flexible membranes of the membrane switch to each other.

The Heidorn U.S. Pat. No. 5,308,106 discloses an air bag module cover assembly with a switch subassembly removably attached at a front surface of the assembly.

The Winget U.S. Pat. No. 5,062,661 discloses a rigid plate attached to the substantially rigid remainder of a front panel of an air bag cover to define a hollow compartment which together move upon manual actuation of a flexible, manually operable diaphragm at the front surface of the front panel. The front panel has a first electrically conductive inner surface for making a circuit path with a corresponding second electrically conductive inner surface of the rigid plate.

The Cooke, II U.S. Pat. No. 5,344,185 discloses an air bag cover having a replaceable horn switch and a cover band which is removably secured by screws to sidewalls of a cover door.

The Leonelli U.S. Pat. No. 5,369,232 discloses a membrane horn blow switch integrated into the front panel of an air bag cover. More specifically, the membrane switch seats in and fills a horn actuation area which is a step-down portion of the cover reduced in thickness.

The U.S. Pat. No. 5,198,629 to Hayashi et al. discloses a steering wheel having an insert molded membrane switch.

The U.S. Pat. No. 5,338,059 to Inoue et al. discloses an air bag cover including a horn switch.

The U.S. Pat. No. 5,499,841 to Trojan et al. discloses a housing assembly for an air bag and a vehicle horn switch.

The U.S. Pat. No. 5,639,114 to Margetak et al. discloses an air bag cover having a plurality of force concentrators which cooperate with projections of a horn switch to concentrate force applied to the cover.

The U.S. Pat. No. 5,642,901 to Bowman et al. discloses a relatively flexible thermoplastic air bag cover including a front panel wherein switch activating members enhance activation of a membrane-type switch located at a switch location area of the front panel. This feature provides pressure points which enhance activation of the membrane-type switch. The switch activating members are located on the rear inner surface of the cover in one embodiment and, in another embodiment, on the upper surface of a back plate which provides a hollow compartment for the switch. The switch activating members can be integrally formed in the shape of small circles, ribs, raised dots, X's, etc.

The U.S. Pat. No. 5,685,561 to Kauer discloses a relatively flexible thermoplastic air bag cover assembly having a switch and method of manufacturing same including a thermoplastic electromagnetic material which forms welds between front and back panels of the assembly. The welded front and back panels define a switch pocket therebetween to hold the switch such as a membrane-type horn switch therein. The welds occupy a relatively small amount of surface area yet provide strong polymer-to-polymer linkages between the front and back panels, thereby enlarging the effective switch activation area on the outer surface of the front panel. The welds are located very close to the switch pocket without damaging the switch during manufacturing. The bonds provided by the welds between the front and back panels are strong enough to prevent the switch from exiting the switch pocket during air bag deployment.

Other U.S. patents related hereto include U.S. Pat. Nos. 5,463,258; 5,465,998; 5,085,462; 5,569,893; and 5,725,241.

DISCLOSURE OF INVENTION

An object of the present invention is to provide an air bag cover assembly having a membrane switch and an ornamental pad permanently fastened thereto and method of making same wherein a single, common air bag design can be used with many different ornamental pads, each of which may have a different decorative badge or ornament joined thereto and wherein the membrane-type switch is easily actuable over a relatively large surface area of the air bag cover including the area under the ornament.

Another object of the present invention is to provide an air bag cover assembly having a membrane switch and an ornamental pad permanently fastened thereto and method of making same wherein the assembly is relatively easy and cost effective to make without the need to use a large number of parts which may present safety problems in the event of air bag deployment.

In carrying out the above objects and other objects of the present invention, an air bag cover assembly is provided. The assembly includes a front panel adapted to overlie an undeployed air bag and having inner and outer surfaces and an outer recessed portion. The assembly also includes an ornamental pad having a front outer surface and a rear inner surface. The pad is permanently fastened to the front panel within its outer recessed portion. The pad has a plastic top plate and an ornament permanently joined together at the front outer surface and which together define a switch location area. The assembly further includes a membrane-type switch lying behind the rear inner surface of the pad in the switch location area. The outer recessed portion and the pad form a hollow compartment for the membrane-type switch in the switch location area. The membrane-type switch is activated by depression of the pad at its front outer surface in the switch location area.

Preferably, the plastic top plate has an outer peripheral edge portion and the plastic top plate is permanently fastened to the front panel at the outer peripheral edge portion. The ornament is located completely within the outer peripheral edge portion.

In one embodiment, the ornament is a plastic ornament and the ornament is integrally formed with the plastic top plate.

In another embodiment, the ornament is fixedly secured as a separate part to the plastic top plate. In this embodiment, the plastic top plate is preferably a thermoplastic elastomeric body having a front surface and a rear surface. The body has a plurality of slots extending between the front and rear surfaces at predetermined spaced locations. The ornament is a decorative badge having a plurality of tabs which extend through the corresponding slots. Each of the tabs has a bent portion pressing against the rear surface of the elastomeric body so as to create a constant load on the elastomeric body. The elastomeric body exerts an opposing reaction to the constant load thereby allowing the decorative badge to be fixedly secured to the elastomeric body.

Also, preferably, the outer peripheral edge portion of the plastic top plate includes at least one connecting tower cooperable with a receiving aperture extending through the outer recessed portion for receiving the at least one connecting tower and fastening permanently the ornamental pad to the front cover.

Preferably, a plurality of switch activating members are integrally formed at and project from the outer surface of the outer recessed portion wherein at least one of the switch activating members enhances activation of the membrane-type switch.

Also, preferably, the top plate has a plurality of spaced ribs integrally formed at and projecting from a rear inner surface of the top plate towards the membrane-type switch so that pressure on the front outer surface of the pad is transmitted by the ribs to activate the membrane-type switch.

Further in carrying out the above objects and other objects of the present invention, a method of making an air bag cover having an ornamental pad and a switch secured thereto for an inflatable air bag system is provided. The method includes injection molding a thermoplastic elastomeric body in an injection mold having a shape defining the air bag cover having an outer recessed portion, injection molding a thermoplastic elastomeric body in an injection mold having a shape defining a top plate, forming slots at predetermined, spaced locations extending through the top plate, and providing a decorative ornament having a plurality of tabs extending therefrom at predetermined spaced locations corresponding to the spaced locations of the slots formed in the top plate. The method also includes the steps of inserting the tabs through the slots at a front surface of the top plate and bending the tabs against a rear surface of the top plate to create a substantially constant load on the top plate. The top plate exerts an opposing reaction to the constant load thereby allowing the decorative ornament to be secured to the top plate to form an ornamental pad. The method further includes providing a membrane-type switch, positioning the membrane-type switch in a hollow compartment formed by the upper recessed portion and the pad, and permanently securing the pad to the recessed portion of the air bag cover such that the pad will not detach from the recessed portion when an uninflated air bag is inflated and exits the air bag cover.

Preferably, the step of permanently securing includes the step of melting an outer peripheral edge portion of the top plate.

Still further in carrying out the above objects and other objects of the present invention, a method of making an air bag cover having an ornamental pad and a switch secured thereto for an inflatable air bag system is provided. The method includes injection molding a thermoplastic elastomeric body in an injection mold having a shape defining the air bag cover having an outer recessed portion and injection molding a thermoplastic elastomeric body in an injection mold having a shape defining an ornamental pad including an ornament integrally formed with a top plate. The method further includes providing a membrane-type switch, positioning the membrane-type switch in a hollow compartment formed by the outer recessed portion and the pad, and permanently securing the ornamental pad to the recessed portion of the air bag cover such that the ornamental pad will not detach from the recessed portion when an uninflated air bag inflates and exits the air bag cover.

Again, preferably, the step of permanently securing includes the step of melting an outer peripheral edge portion of the top plate.

The above objects and other objects, features, and advantages of the present invention are readily apparent from the following detailed description of the best mode for carrying out the invention when taken in connection with the accompanying drawings.

BRIEF DESCRIPTION OF DRAWINGS

FIG. 3 is a sectional view, partially broken away, taken along lines 3—3 of FIG. 1 prior to fixed securement of an ornamental pad to a front panel of the assembly;

FIG. 4 is a sectional view, partially broken away, of a second embodiment of the assembly after fixed securement of a different ornamental pad to a different front panel;

FIG. 5 is an exploded perspective view illustrating the ornamental pad of FIG. 4; and FIG. 6 is a rear view, partially broken away, of the ornamental pad of FIG. 5 wherein an ornament is fixedly secured as a separate part to a plastic top plate at its back surface.

BEST MODE FOR CARRYING OUT THE INVENTION

Figure 1:
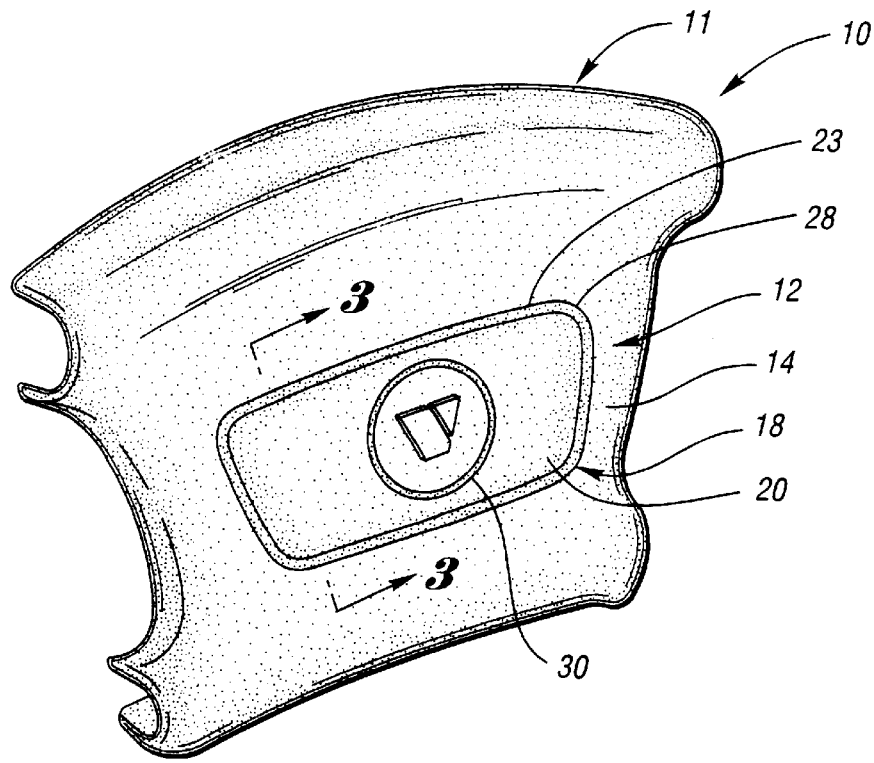
FIG. 1 is a front perspective view of an air bag cover assembly constructed in accordance with the present invention.
Figure 2:
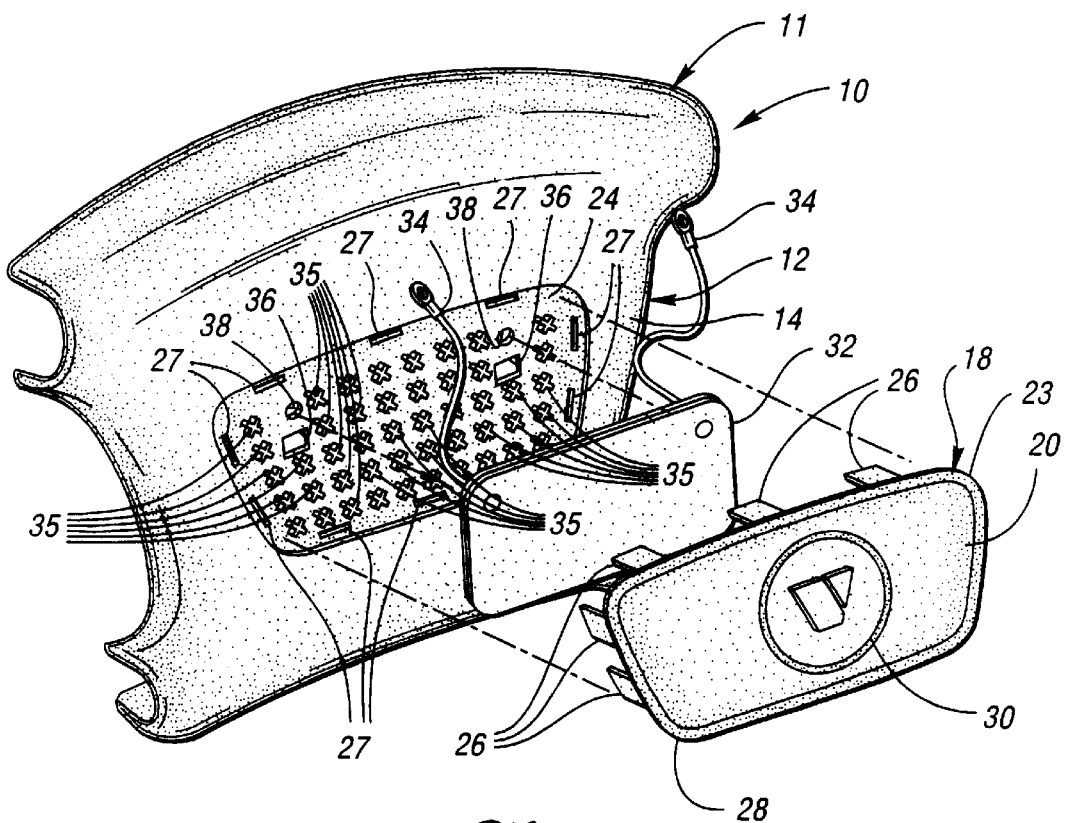
FIG. 2 is an exploded perspective view of the assembly of FIG. 1.

Referring now to the drawing Figures, there is illustrated in FIGS. 1–3 a first embodiment of an automotive air bag cover assembly, generally indicated at 10, constructed in accordance with the present invention. Typically, the air bag cover assembly 10 is adapted to be secured at the top end of the vehicle drive column (not shown) at the steering wheel of the vehicle.

The air bag cover assembly 10 preferably includes a relatively flexible thermoplastic air bag cover, generally indicated at 11, formed by injection molding with a thermoplastic such as Santoprene® (a trademark of Monsanto Company) or Hytrel® (a trademark of Dupont).

The air bag cover 11 includes a front panel, generally indicated at 12, overlying an undeployed air bag (not shown). The front panel 12 has a front outer surface 14 and a rear inner surface 16 (i.e., FIG. 3).

The front panel 12 is separable along a prescribed tear pattern (not shown) upon deployment of the air bag. The tear pattern may be hidden when viewing the assembly 10 from the front surface 14.

The assembly 10 also includes an ornamental pad, generally indicated at 18. The pad 18 has a front outer surface 20 and a rear inner surface 22 (i.e., FIG. 3). The pad 18 includes a relatively flexible thermoplastic top plate 23 which permanently fastens the pad 18 to the front panel 12 within an outer recessed portion 24 thereof by a plurality of connecting towers 26, as best shown in FIGS. 2 and 3. The towers 26 extend into spaced slots 27 formed in the portion 24 but have not yet been deformed such as by heat in FIG. 3 to fix the pad 18 to the front panel 12. However, it is to be understood that the towers 26 fixedly secure the pad 18 to the front panel such as by heat staking, hot-cold upset and the like.

Alternatively, the towers 26, which extend from and are integrally connected to an outer peripheral edge portion 28 of the top plate 23, may be eliminated and the top plate 23 can be fixedly secured to the front panel 12 by the bonding process illustrated in U.S. Pat. No. 5,685,561. In this process, strips of a thermoplastic electromagnetic material, such as an EMAWELD® material, would be positioned in channels formed between the outer recessed portion 24 and the outer peripheral edge portion 28 and an electromagnetic field would then be established about the EMAWELD® material positioned in the channels for a time sufficient to melt the material which, in turn, melts surface layers of the outer peripheral edge portion 28 and the outer recessed portion 24.

The pad 18 also includes an ornament 30 which, in the embodiment of FIGS. 1–3, is integrally formed with the plastic top plate 23. The ornament 30 may have different shapes, have a foil outer layer or film or may be painted.

The plastic top plate 23 and the ornament 30 define a switch location area in which a membrane-type or foil horn switch 32 of the air bag cover assembly 10 is located. The switch 32 lies behind the rear inner surface of the pad 18 within a hollow compartment 33 (i.e., FIG. 3) in the switch activation area. The switch 32 includes electrical leads 34 adapted to be connected to the vehicle's electrical system and which extend through holes 36 formed through the outer recessed portion 24. Apertures 38 are also formed through the outer recessed portion 24 to receive tops (not shown) extending from and connected to a back surface of the switch 32 to position the switch 32 on the outer recessed portion 24 within the hollow compartment 33.

An outer surface of the outer recessed portion 24 of the front panel 12 has a plurality of switch activating members 35 (not shown in FIG. 3 for purposes of clarity) integrally formed at and projecting therefrom wherein at least one of the switch activating members 35 enhances activation of the membrane-type switch 32. The switch activating members 35 can be integrally formed in the shape of small circles, ribs, raised dots, X's, etc. as illustrated in U.S. Pat. No. 5,642,901.

The hollow compartment 33 is partially formed and defined by the towers 26, a portion of which engages the outer surface of the outer recessed portion 24 as illustrated in FIG. 3. Alternatively, as illustrated in FIG. 4, a hollow compartment 33' for the switch 32 is partially formed and defined by rim portions 39' of the outer recessed portion 24' of a second embodiment of the present invention wherein parts having the same or similar function to the parts of the first embodiment of FIGS. 1–3 have the same reference numeral but a single prime designation.

As illustrated in FIGS. 3 and 4, the rear inner surface 22 and 22', respectively, of the top plates 23 and 23' have a plurality of spaced ribs 42 and 42', respectively, integrally formed thereon and which ribs 42 and 42' project toward the switch 32. In the first embodiment of FIGS. 1–3, pressure on the outer surface 20 of the pad 18 at the switch activation area is transmitted initially by the ornament 30 and/or the top plate 23 to the distal ends of the ribs 42 and then by the ribs 42 to activate the switch 32. The second embodiment of FIGS. 4–6 operates in a similar fashion.

Turning now to FIG. 5, there is shown an exploded perspective view of the second embodiment of the ornamental panel 12' of FIG. 4 which includes a decorative badge or ornament 44 fixedly secured to and within an outer recessed portion 46 of the top plate 23'. The resulting pad 18' is preferably installed at the outer recessed portion 24' of the front panel 12' over the switch 32 by connecting towers 26' which extend into and are secured within corresponding apertures such as by heat staking.

Although the decorative ornament 44 shown in FIG. 5 is shown as being circular in nature, it should be appreciated that other shapes are well suited for the present invention including, but not limited to, a square badge or a triangular badge.

The decorative ornament 44 includes a plurality of tabs 48, preferably six tabs 48, bent against a rear surface 22' of the top plate 23'. The decorative ornament 44 is secured to the top plate 23' by inserting the tabs 48 through corresponding slots 52 extending between front and rear surfaces of the recessed portion 46. The slots 52 may be formed during the injection molding process of the top plate 23' or during a subsequent step following the injection molding process.

The tabs 48 are then bent against the rear surface of the recessed portion 46 as illustrated in FIG. 6. The bent tabs 48 press against the rear surface of the recessed portion 46 to create a substantially constant load on the elastomeric material of the top plate 23'. In reaction to this constant load, the elastomeric material of the top plate 23' exerts an opposing reaction (spring-like force) which allows the ornament 44 to be secured to the top plate 23'.

In the preferred embodiment, the tabs 48 are bent inwardly toward a center of the recessed portion 46 as illustrated in FIG. 6. Not only does this arrangement take up less space on the rear surface of the recessed portion 46, but it also allows the ornament 44 to aid in creating a greater force exerted by the elastomeric material due to the sandwich effect of the ornament 44 and the tabs 48. Alternatively, the tabs 48 could be bent outwardly away from the center of the recessed portion 46.

The tabs 48 are preferably rectangular in shape and preferably have a length of approximately 11 mm, a width of approximately 7 mm, and a thickness of approximately 0.5–0.7 mm. Furthermore, although the tabs 48 are shown extending from an outer periphery of the ornament 44, the tabs 48 may alternatively extend from a center portion of the ornament 44. In the latter case, it is preferred that the tabs 48 bend outwardly against the rear surface of the top plate 23'.

The decorative ornament 44 may be a unitary piece or comprised of two separate portions. In the first alternative, the ornament 44 is preferably a 0.020 inch thick aluminum (1080 grade) material with a decorative design painted or etched on a front surface thereof. In the second alternative, the ornament 44 may comprise the aluminum portion having the tabs 48 extending therefrom and an emblem portion comprising a selective pour, e.g., lensolad or acrylic, covering.

The tabs 48 are preferably bent at least 90 degrees, up to approximately 110 degrees, in order to create the constant load on the elastomeric material of the top plate 23'. To aid in aligning the tabs 48 with the rear surface of the recessed portion 46, the recessed portion 46 may include a plurality of depressions formed in its rear surface.

The depressions correspond to the width and length of the tabs 48 and are preferably as deep as at least the thickness of the tabs 48. The depressions extend away from the slots 52 and may have a downwardly extending slope to further aid in securing the ornament 44 to the top plate 23'. The depressions serve many purposes such as, but not limited to, aiding as a visual check to insure that the ornament 44 is installed and aligned correctly, aiding as a visual check to insure that the tabs 48 did not break off during bending, aiding in preventing rotation of the ornament 44 after installation, and aiding in hiding sharp edges during handling.

While embodiments of the invention have been illustrated and described, it is not intended that these embodiments illustrate and describe all possible forms of the invention. Rather, the words used in the specification are words of description rather than limitation, and that various changes may be made without departing from the spirit and scope of the invention.

What is claimed is:

1. An air bag cover assembly comprising:
   a front panel adapted to overlie an undeployed air bag and having inner and outer surfaces and an outer recessed portion;
   an ornamental pad having a front outer surface and a rear inner surface, the pad being permanently fastened to the front panel within its outer recessed portion, the pad having a plastic top plate and an ornament permanently joined together at the front outer surface and which together define a switch location area; and
   a membrane-type switch lying behind the rear inner surface of the pad in the switch location area, the outer recessed portion and the pad forming a hollow compartment for the membrane-type switch in the switch location area, wherein the membrane-type switch is activated by depression of the pad at its front outer surface in the switch location area.

2. The assembly as claimed in claim 1 wherein the plastic top plate has an outer peripheral edge portion and wherein the plastic top plate is permanently fastened to the front panel at the outer peripheral edge portion and wherein the ornament is located completely within the outer peripheral edge portion.

3. The assembly as claimed in claim 1 wherein the ornament is a plastic ornament and wherein the ornament is integrally formed with the plastic top plate.

4. The assembly as claimed in claim 1 wherein the ornament is fixedly secured as a separate part to the plastic top plate.

5. The assembly as claimed in claim 4 wherein the plastic top plate is a thermoplastic elastomeric body having a front surface and a rear surface, the body having a plurality of slots extending between the front and rear surfaces at predetermined spaced locations and wherein the ornament is a decorative badge having a plurality of tabs which extend through the corresponding slots, each of the tabs having a bent portion pressing against the rear surface of the elastomeric body so as to create a constant load on the elastomeric body, wherein the elastomeric body exerts an opposing reaction to the constant load thereby allowing the decorative badge to be fixedly secured to the elastomeric body.

6. The assembly as claimed in claim 2 wherein the outer peripheral edge portion of the plastic top plate includes at least one connecting tower cooperable with a receiving aperture extending through the outer recessed portion for receiving the at least one connecting tower and permanently fastening the ornamental pad to the front cover.

7. The assembly as claimed in claim 1 further comprising a plurality of switch activating members integrally formed at and projecting from the outer surface of the outer recessed portion wherein at least one of the switch activating members enhances activation of the membrane-type switch.

8. The assembly as claimed in claim 1 wherein the top plate has a plurality of spaced ribs integrally formed at and projecting from a rear inner surface of the top plate towards the membrane-type switch so that pressure on the front outer surface of the pad is transmitted by the ribs to activate the membrane-type switch.

9. A method of making an air bag cover having an ornamental pad and a switch secured thereto for an inflatable air bag system, the method comprising:

injection molding a thermoplastic elastomeric body in an injection mold having a shape defining the air bag cover having an outer recessed portion;

injection molding a thermoplastic elastomeric body in an injection mold having a shape defining a top plate;

forming slots at predetermined, spaced locations extending through the top plate; providing a decorative ornament having a plurality of tabs extending therefrom at predetermined spaced locations corresponding to the spaced locations of the slots formed in the top plate;

inserting the tabs through the slots at a front surface of the top plate;

bending the tabs against a rear surface of the top plate to create a substantially constant load on the top plate, wherein the top plate exerts an opposing reaction to the constant load thereby allowing the decorative ornament to be secured to the top plate to form an ornamental pad;

providing a membrane-type switch;

positioning the membrane-type switch in a hollow compartment formed by the upper recessed portion and the pad; and permanently securing the pad to the recessed portion of the air bag cover such that the pad will not detach from the recessed portion when an uninflated air bag is inflated and exits the air bag cover.

10. The method of claim 9 wherein the step of permanently securing includes the step of melting an outer peripheral edge portion of the top plate.

11. A method of making an air bag cover having an ornamental pad and a switch secured thereto for an inflatable air bag system, the method comprising:

injection molding a thermoplastic elastomeric body in an injection mold having a shape defining the air bag cover having an outer recessed portion;

injection molding a thermoplastic elastomeric body in an injection mold having a shape defining an ornamental pad including an ornament integrally formed with a top plate;

providing a membrane-type switch, positioning the membrane-type switch in a hollow compartment formed by the outer recessed portion and the pad; and permanently securing the ornamental pad to the recessed portion of the air bag cover such that the ornamental pad will not detach from the recessed portion when an uninflated air bag inflates and exits the air bag cover.

12. The method as claimed in claim 11 wherein the step of permanently securing includes the step of melting an outer peripheral edge portion of the top plate.

* * * * *